No. 639,553. Patented Dec. 19, 1899.
W. GABRIELSON.
TRAP HOOK.
(Application filed Apr. 17, 1899.)
(No Model.)
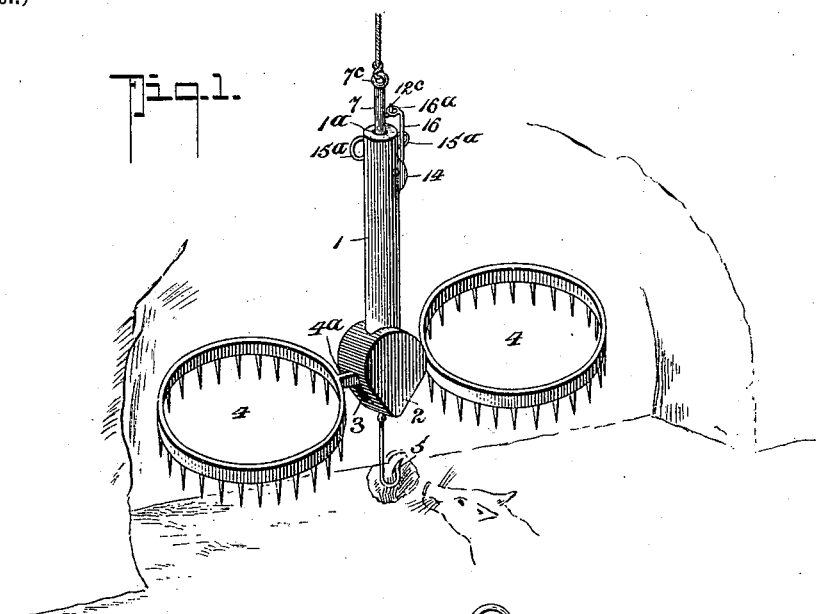
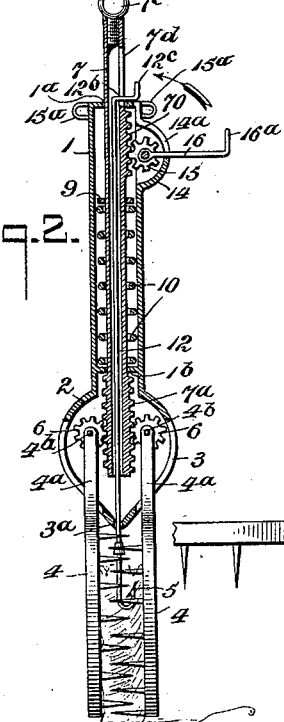
WITNESSES
H. G. Dieterich
Harry L. Marsh
INVENTOR
Wm. Gabrielson
BY
Fred G. Dieterich & Co.
ATTORNEYS
THE NORRIS PETERS CO., PHOTO-LITHO., WASHINGTON, D. C.

UNITED STATES PATENT OFFICE.

WILLIAM GABRIELSON, OF CRYSTAL FALLS, MICHIGAN.

TRAP-HOOK.

SPECIFICATION forming part of Letters Patent No. 639,553, dated December 19, 1899.

Application filed April 17, 1899. Serial No. 713,365. (No model.)

*To all whom it may concern:*

Be it known that I, WILLIAM GABRIELSON, residing at Crystal Falls, in the county of Iron and State of Michigan, have invented a new and Improved Trap-Hook, of which the following is a specification.

This invention relates to improvements in that class of fish or trap hooks in which the trap or impaling members are spring-actuated or close in on the fish or animal for which the trap may be set by the releasing of a suitable catch which carries the bait, the nibbling or grabbing of which releases the detent which holds the operating-spring under tension and permits the claws, hooks, or other grips to close in on the animal or fish and hold the same secure.

The primary object of my invention is to provide a device of this character of a very simple and economical construction which can be easily manufactured, readily set up for use, and which will effectively serve for its intended purposes.

This invention comprehends generally a special construction of parts, including a central hanger-shell, in which is slidably held a spring-actuated rack-bar adapted to impart movement to a pair of oppositely-disposed impaling or hook members adapted, when the operating-spring is released, to move toward each other and close in on the object tugging at the bait and in which the detent for holding the operating-spring under its normal tension and the impaling members to their extended position is released at the pull on the bait-hook.

In its subordinate features my invention embodies certain novel details and specific construction of parts, as will be first described and then pointed out in the claims, reference being had to the accompanying drawings, in which—

Figure 1 is a view illustrating my invention set for use. Fig. 2 shows the parts released and in their gripping position. Fig. 3 is a vertical section of the same, the parts being shown set; and Fig. 4 is a horizontal section taken on the line 4 4 of Fig. 3.

In its practical construction my improvement comprises a tubular shank 1, the upper end of which has a guide-opening $1^a$, while the lower end has a like opening $1^b$ communicating with the pendent casing 2, the opposite ends of which have elongated slots 3, through which the shanks $4^a$ of the impaling members or trap-jaws 4 pass and in which they are adapted to oscillate. The shanks $4^a$ are pivotally mounted on studs $4^b$, and each shank carries a cog-gear 6, the said gears 6 being held to mesh with the rack portion $7^a$, formed on the lower external face of the tubular rod 7, vertically movable within the guide-openings $1^b$ and $1^a$ of the tubular shank, as clearly shown in Figs. 2 and 3, the upper end of said rod 7 being projected above the said shank and provided with a knob $7^c$, the stem of which is threaded in the upper end of the tubular rod 7. The tubular rod 7 has a fixedly-held disk 9, between which and the bottom of the shank 1 is held the operating coil-spring 10, which is disposed about the arm 7, as best shown in Fig. 2.

Within the tubular rod 7 is held to play a tripper-rod 12, the lower end of which passes through a central guide $3^a$ of the casing 2 and carries at its pendent end a hook 5, while the upper end of said rod terminates in a lateral portion $12^b$, the end of which is in the nature of an angle extension $12^c$, and said portion $12^b$ $12^c$ is bent outward and projects through an elongated slot $7^d$ in the tubular rod 7, the rod 12 being bent through the tubular rod 7 at a point above the shank 1, as clearly shown in Fig. 3.

Near the upper end the tubular shank 1 has a lateral casing 14, within which is journaled a cog 15, the shaft of which carries a finger-operated locking-rod 16, which plays in a slotway $14^a$, in the casing 14 and has the upper end terminating in an eye $16^a$, the purpose of which will presently be explained. The cog-gear 14 is held to mesh with the rack-gear section 70 on the face of the tubular rod 7.

The operation of my improved trap is best explained as follows: Assuming the parts to be in their released position, as indicated in Fig. 2, and it is desired to set the trap, the operator moves the finger member 16 in the direction indicated by the arrow. This causes the tubular rod 7 to move downward, and by reason of such movement the tooth members 4, through the medium of the connecting gearing will be swung upward to the position shown in Figs. 1 and 2. The operator in swinging the arm 16 over slightly raises the angle end of the bait-rod, so that the said member 16 can be moved into engagement therewith, as indicated in Fig. 1, it being manifest that the frictional contact of the said members will hold the parts to such position. Now when thus set it is obvious that by tugging on the bait-hook the bait-rod will be drawn down sufficiently to permit its angle end $12^c$ slipping out of engagement with the member 16, which being thus released allows the spring, by reason of its expansive force, to throw the rod 7 upward, thereby causing the impaling members 4 to quickly close in upon the object tugging at the bait and at the same time swing the finger-operated member 16 back to the position indicated in Fig. 2.

From the foregoing description, taken in connection with the accompanying drawings, it will be observed that the construction of my trap is of a very simple and inexpensive nature and of such character that the same can be easily set at almost any point desired.

It is manifest that the device can be made of sizes small enough to impale large or small fish, rats, mice, &c., or large enough to entrap large game.

Having thus described my invention, what I claim, and desire to secure by Letters Patent, is—

1. A trap of the character described, comprising a suspended tube having a casing at the lower end; a pair of oppositely-disposed impaling members adapted to close toward each other, said members being pivotally secured within the casing and having on their pivot-axis each a cog-pinion; a tubular rack-bar engaging said pinions and reciprocally held within the suspended tube; a spring for normally forcing the rack-bar upward and a detent for holding the spring rack-bar under tension; and a bait-rod reciprocally held within the tubular rack-bar and having its upper end made to engage the detent substantially as shown and for the purposes described.

2. The combination with the tubular shank having a pendent casing, said shank having guides $1^b$, and $1^a$, at their upper and lower ends; a tubular rod slidable within the guides $1^a$ $1^b$; a spring for normally forcing said rod upward, the lower end of said rod working in the casing and having an exterior rack-face; cog-gears mounted on each side of the rack portion of the bar to engage therewith; arms secured to such cog-teeth extended outwardly through the casing in opposite directions and carrying impaling members adapted to close against each other, said tubular rod having a rack portion at the upper end; a finger-operated cog-detent engaging the upper end of said tubular rod; a bait-rod movable within the tubular rod, having its upper end projected through and vertically movable on the upper end of the slotted rod and adapted to engage with the cog-detent, as shown and for the purposes described.

WM. GABRIELSON.

Witnesses:
G. E. VOOS,
CLARA CLAPP.